United States Patent
Cruger et al.

[15] 3,695,559
[45] Oct. 3, 1972

[54] AIRCRAFT ARRESTING APPARATUS
[72] Inventors: Robert W. Cruger, Springfield; Floyd G. Silver, Wallingford, both of Pa.
[73] Assignee: Gulf & Western Industrial Products Company, Grand Rapids, Mich.
[22] Filed: May 20, 1970
[21] Appl. No.: 39,047

[52] U.S. Cl. ................................................244/110 C
[51] Int. Cl. ................................................B64f 1/02
[58] Field of Search.....244/110 R, 110 A, 110 C, 63; 242/151, 152, 76; 248/18; 188/1 B

[56] References Cited

UNITED STATES PATENTS

| 3,182,935 | 5/1965 | Wischhoefer..........244/110 A |
| 3,356,319 | 12/1967 | Fonden et al..........244/110 A |
| 3,497,166 | 2/1970 | Di Girolamo..........244/110 R |
| 3,589,652 | 6/1971 | Thompson, Jr........244/110 A |
| 3,502,289 | 3/1970 | Kelly et al..............244/110 R |
| 3,259,213 | 7/1966 | Daniels et al. ......244/110 A X |
| 2,860,732 | 11/1958 | Snow.....................244/110 A |
| 2,967,683 | 1/1961 | Crater....................244/110 A |
| 3,215,375 | 11/1965 | Radovitz................244/110 C |

FOREIGN PATENTS OR APPLICATIONS 980,343   5/1951   France........................244/63

Primary Examiner—Milton Buchler
Assistant Examiner—Paul E. Sauberer
Attorney—Meyer, Tilberry and Body

[57] ABSTRACT

An aircraft arresting apparatus includes a pair of rotatable reels mounted on vertical axes on opposite sides of an aircraft runway. Flat elongated fabric tapes are wound upon the reels in layer-by-layer convolutions. The free ends of the tapes are connected with a pendant which is stretched in tension across the runway. Lead-off sheave means are located closely adjacent each reel and the tapes are guided over the lead-off sheave means. Each lead-off sheave means is arranged so that each tape is in contact with a lead-off sheave means over a sufficient angle of wrap to reflect any lateral or vertical tape wave motions and prevent them from going past the lead-off sheave means toward the reels.

12 Claims, 11 Drawing Figures

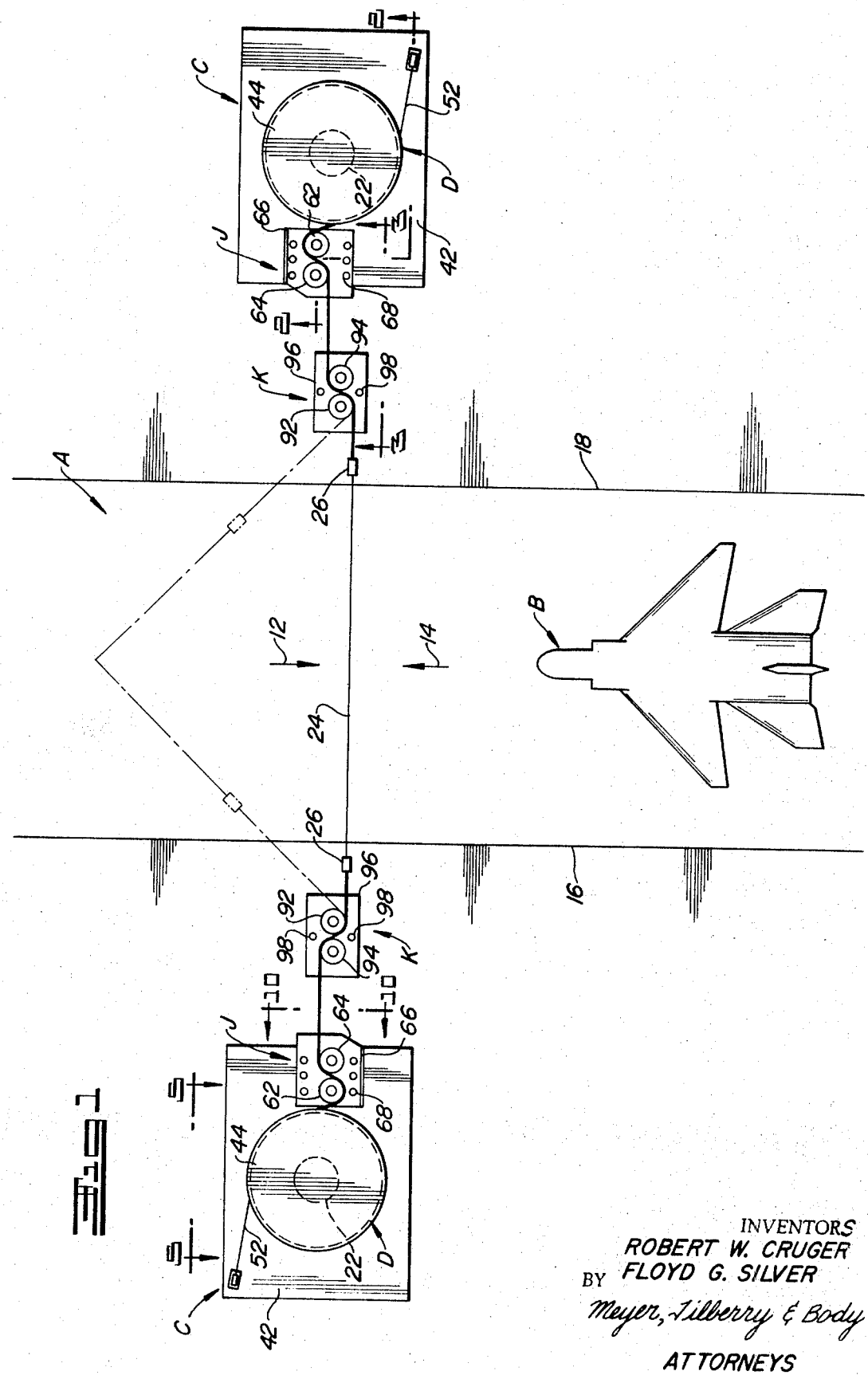

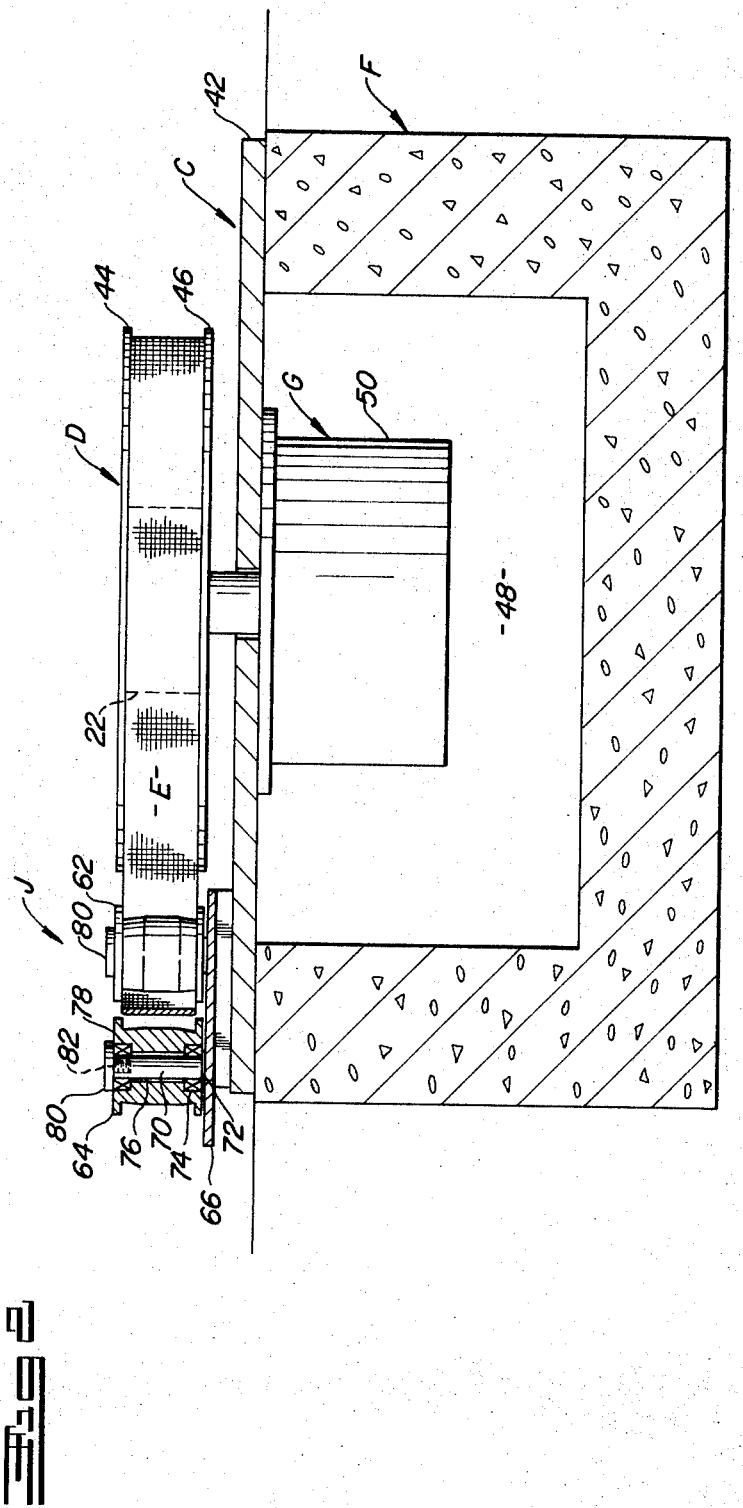

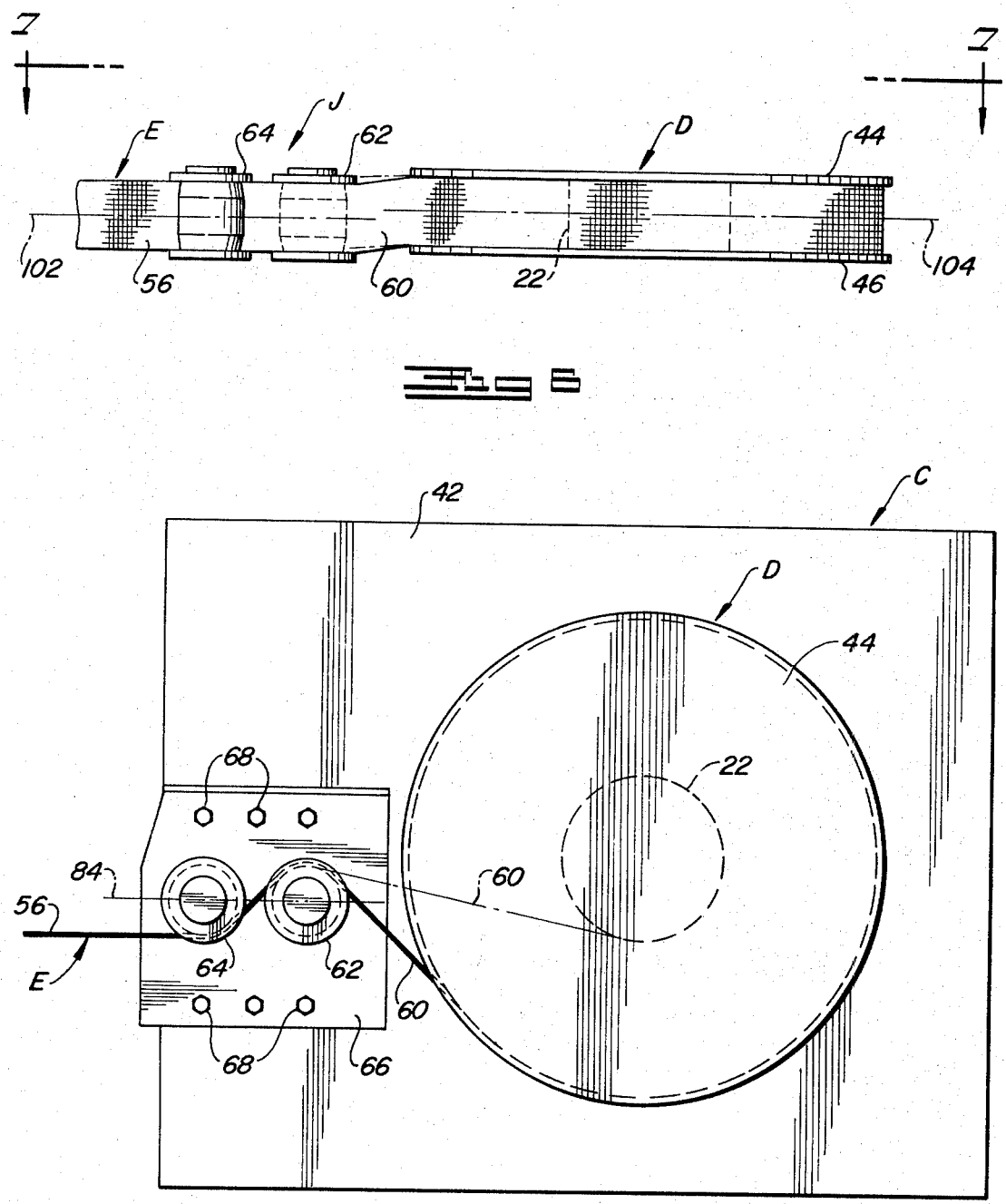

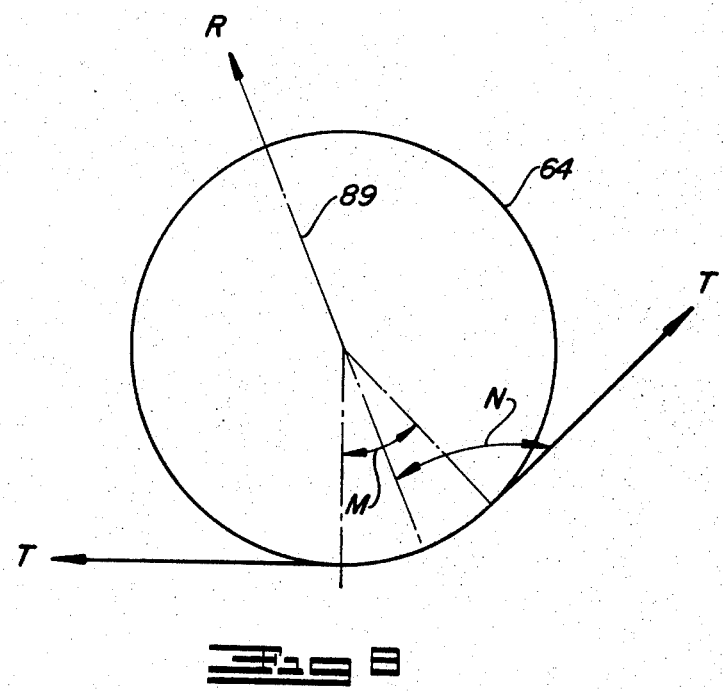
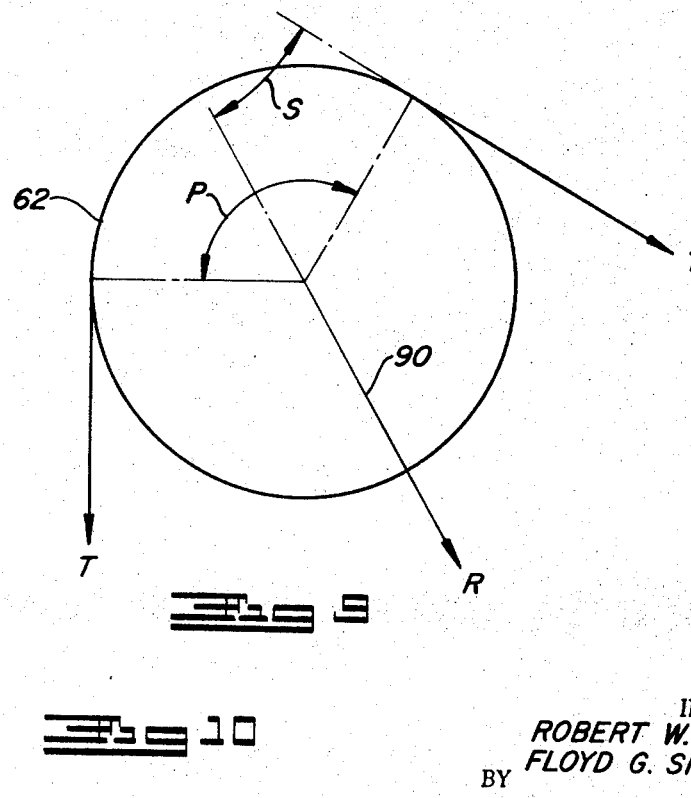
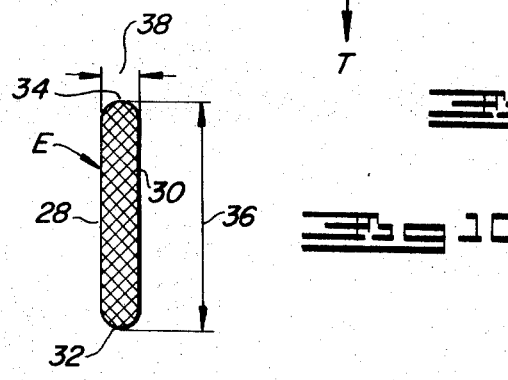
INVENTORS
ROBERT W. CRUGER
FLOYD G. SILVER
ATTORNEYS

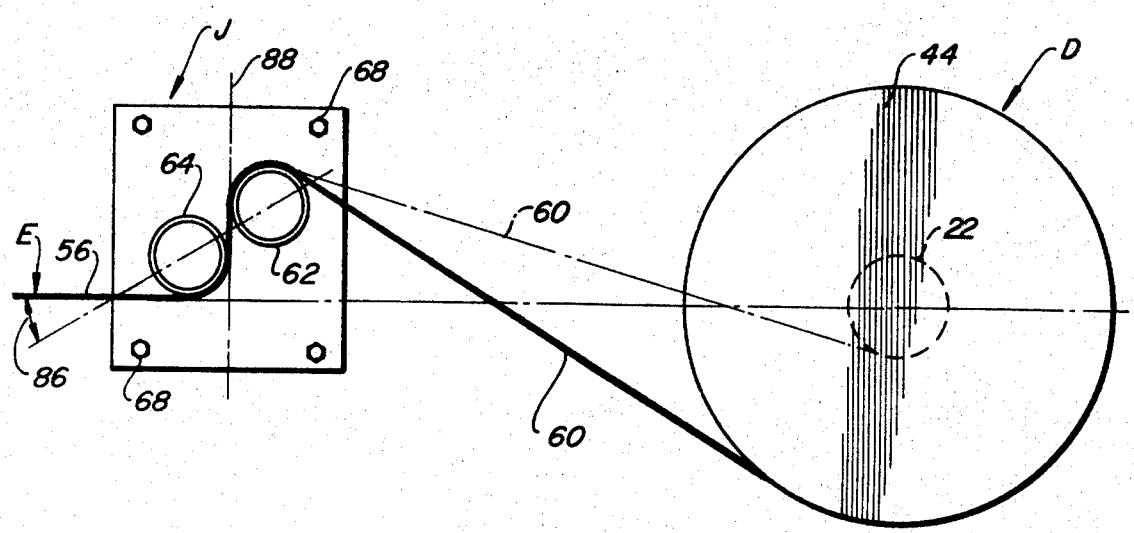

AIRCRAFT ARRESTING APPARATUS

BACKGROUND OF THE INVENTION

This application pertains to the art of aircraft arresting apparatus, and more particularly, to apparatus of the type in which flat elongated tapes are coiled upon reels which are rotatably mounted on vertical axes on opposite sides of an aircraft runway.

Aircraft arresting apparatus of a known type includes a pair of reels rotatably mounted on vertical axes on opposite sides of the aircraft runway. Flat elongated fabric tapes are coiled in layer-by-layer convolutions on the reels. The tapes have first ends connected to hubs on the reels for coiling of the tapes thereon, and second tape ends connected with a pendant which is stretched in tension across an aircraft runway. A holding means is provided for releasably preventing rotation of the reels in order to maintain the pendant and portions of the tapes in tension prior to arrestment of an aircraft. The tapes extend a substantial distance from the reels to their points of connection with a pendant, with the width dimension of the tapes lying in a substantially vertical plane. Due to the fact that it is impractical to place sufficient tension in the tapes to keep them horizontal, the tapes will sag in a catenary below the horizontal. Engagement of an aircraft with the pendant suddenly increases the tension in the tapes and snaps the tapes upwardly out of their catenary. This produces a vertical oscillation in the tapes. The oscillation causes the tape to slip off of its own stack on the reels and become wedged between a reel sideplate and the remaining tape stack on the reel. Such an occurrence may cause tape failure or other damage to the system which will prevent further payout of tape. While conventional apparatus provides lead-off sheave means positioned adjacent the reels for guiding the tapes during coiling and uncoiling movement, previous lead-off sheave arrangements have not been adequate to either prevent these oscillations from reaching the tape on the reel or to guide the tape in a uniform winding and unwinding path.

A further problem has existed in coiling a tape back onto a reel. Misalignment between a reel and a sheave means often causes the tape to be coiled in such a manner that succeeding layers are misaligned with previous layers. With the present invention, each succeeding layer of tape coiled upon the reel is more exactly aligned with preceding layers. With misalignment between adjacent layers of tape on the reel, the second portion of the tape between the lead-off sheave means and the reel will have its own oscillation imparted thereto due to being uncoiled from different paths on the reel.

SUMMARY OF THE INVENTION

In accordance with the invention, each lead-off sheave means is positioned so that a tape is in contact therewith over a sufficient angle of wrap that the forces developed between the sheave means and the tape prevent transmission of the oscillation past the sheave means. Such angle of wrap should be at least ninety degrees. Each sheave means is rotatable so that the frictional force between a tape and sheave means during arrestment of an aircraft is rolling friction. Each lead-off sheave is positioned so that the wrap angle prevents the oscillations from passing the lead-off sheave means. That is, each tape includes a first portion extending from the lead-off sheave and around a runway edge sheave to connection with a pendant, and a second tape portion extending from the lead-off sheave means to the reel. When the first portion is oscillated by being snapped out of its catenary, the lead-off sheave means is positioned in such a manner that the oscillation is damped at the lead-off sheave means and can not reach the second portion of the tape. Further in accordance with the present invention, each lead-off sheave means is positioned as close as possible to the outer periphery of a reel and the tape remains in contact with the sheave means over an arc of at least 90° throughout the entire dynamic region of arrestment. In a preferred arrangement, a pair of lead-off sheaves are provided in closely spaced relationship and the tape is trained therearound in a reversely curved path. With a pair of lead-off sheave means positioned closely adjacent one another, the tape is also guided in a continuous straight path when being coiled upon the reel.

It is a principal object of the present invention to provide an improved aircraft arresting apparatus in which oscillations in flat elongated tapes are prevented from reaching reels on which the tapes are coiled.

It is another object of the invention to prevent such oscillations from reaching a reel at least during the dynamic region of arrestment.

It is a further object of the invention to provide an aircraft arresting apparatus in which a tape is coiled upon a reel in a straight path so that adjacent layers of tape on the reel are not misaligned.

It is also an object of the invention to provide an aircraft arresting apparatus with guide sheaves positioned closely adjacent a vertical axis reel so that oscillations in a tape will not force the sides off of the reel or cause the tape to wedge between a reel sideplate and its own tape stack.

BRIEF DESCRIPTION OF THE DRAWINGS

The invention may take form in certain parts and arrangements of parts, a preferred embodiment of which will be described in detail in the accompanying specification and drawings which form a part hereof.

FIG. 1 is a top plan view of an aircraft arresting apparatus installed adjacent the aircraft runway and having the improvement of the present invention incorporated therein;

FIG. 2 is a cross-sectional elevational view looking in the direction of arrows 2—2 of FIG. 1;

FIG. 6 is a side elevational view looking in the same direction as FIG. 5;

FIG. 7 is a top plan view looking in the direction of arrows 7—7 of FIG. 6;

FIG. 8 is a diagrammatic illustration of the forces produced by tape tension on a lead-off sheave;

FIG. 9 is a diagrammatic illustration of the forces produced by tape tension on another lead-off sheave;

FIG. 10 is a cross-sectional view looking in the direction of arrows 10—10 of FIG. 1; and FIG. 11 is a top plan view similar to FIG. 7 showing a modified sheave arrangement.

DESCRIPTION OF THE PREFERRED EMBODIMENT

Figure 3:
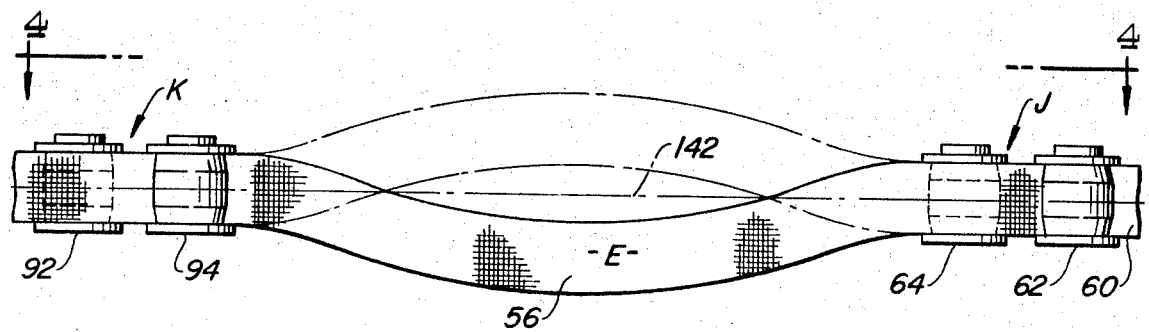
FIG. 3 is a side elevational view looking in the direction of arrows 3—3 of FIG. 1.

Referring now to the drawings, wherein the showings are for purposes of illustrating a preferred embodiment of the invention only and not for purposes of limiting same, FIG. 1 shows an aircraft runway A on which an aircraft B is adapted to land in the direction of either arrows 12 or 14. Aircraft runway A may have any desired width, and by way of example may be 100 feet wide from side edge 16 to side edge 18. Positioned in somewhat remote locations from side edges 16 and 18 of runway A are energy absorber units C. Each energy absorber unit C includes a rotatable reel D mounted for rotation on a substantially vertical axis. Each reel D includes a hub 22 to which a first end of a flat elongated tape E is connected. Flat elongated tape E is coiled upon hub 22 of reel D in layer-by-layer convolutions. The second end of tape E is attached to a pendant 24 by conventional connecting device 26. Pendant 24 may be in the form of a steel cable, a net or a band of synthetic material. Tape E is guided between a lead-off sheave means J and runway edge sheave means K. Aircraft B will engage pendant or net 24 to cause rotation of reels D and uncoiling of tapes E therefrom so that pendant 24, connecting devices 26 and tapes E will progressively move down runway A with aircraft B, nd only one of such progressive positions is shown by shadow lines in FIG. 1. Tapes E may be of a known type such as the flat elongated woven fabric tape described in U.S. Pat. No. 25,406 to Byrne et al. As shown in FIG. 10, each tape E includes substantially parallel opposite flat faces 28 and 30, and opposite edges 32 and 34. In one arrangement, tapes E may have a width dimension 36 measured from side edge 32 to side edge 34 around 8 inches, and a width or thickness dimension 38 measured from flat face 28 to flat face 30 of around 0.345 inches. In addition, each tape E may have a total length of around 1,000 feet. It will be recognized that the dimensions and length of tapes E may be varied, as desired, without departing from the scope of the present invention.

Each energy absorber unit C includes a metal base member 42 on which all components of each unit are mounted. Each reel D includes a pair of spaced apart sideplates 44 and 46 which are spaced apart a distance substantially the same as, or slight greater than, the width dimension of tapes E. Base 42 of energy absorber C may be mounted on a concrete foundation F which is below ground level so that the reel D is above ground level only a sufficient distance to prevent dragging of tape E on the ground surface during arrestment of an aircraft. Concrete base F includes an internal opening 48 in which a housing 50 of a hydraulic or friction brake unit G is received.

In making the apparatus ready for operation, reels D are rotated in a direction to (oil tapes E thereon in layer-by-layer convolutions and to stretch pendant 24 under tension across runway A. When tapes E are completely wound upon reels D, the parts are positioned as shown in FIG. 1 with pendant 24 stretched tightly in tension across runway A. Reels D are rotated in a direction to coil tapes E thereon in any well-known manner such as by providing a rewind motor or looping a rope around a capstan attached to the reel and pulling the rope. Any conventional arrangement may be provided for statically holding reels D against rotation with pendant 24 stretched in tension across runway A. One conventional arrangement comprises a replaceable frangible link holding means illustrated diagrammatically at 52 in FIG. 1. Holding means 52 maintains tapes E and pendant 24 under a predetermined static tension force such as around 5,000 pounds. Upon engagement of an aircraft B with pendant 24, the tension in pendant 24 and tapes E will rapidly become substantially greater than the predetermined static tension force. When the tension reaches any desired predetermined force greater than the static tension force, such as around 7,000 pounds, holding means 24 will fracture and reels D will be released for rotation to uncoil tapes E therefrom. During uncoiling of tapes E, brake units G will provide retarding torque to reels D for maintaining considerable tension in tapes E and provide a retarding force on aircraft B.

Figure 4:
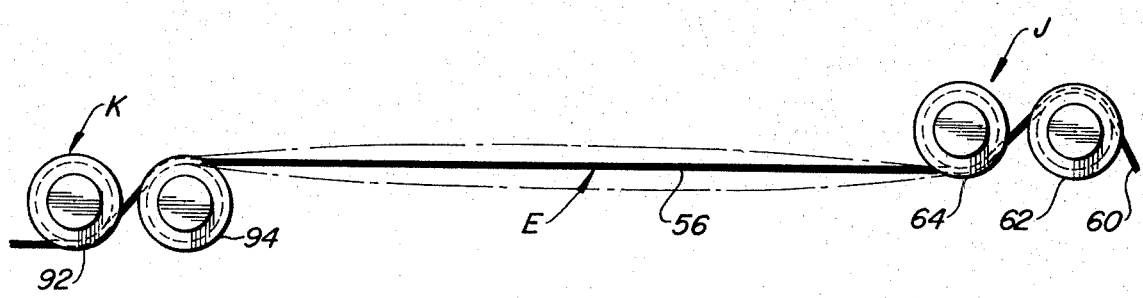
FIG. 4 is a top elevational view looking in the direction of arrows 4—4 of FIG. 3.
Figure 5:
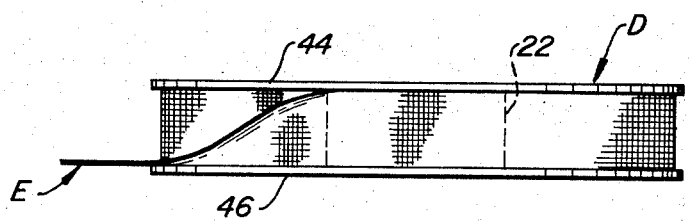
FIG. 5 is a side elevational view looking in the direction of arrows 5—5 of FIG. 1 and showing the reel and tape of FIG. 1 in an improper operating condition.

In accordance with the invention, tapes E extend from reels D around rotatable lead-off sheave means J and around rotatable runway edge sheave means K. Due to the desirability of having energy absorber units C positioned a substantial distance away from edges 16 and 18 of runway A, the distance between lead-off sheave means J and runway edge sheave means K may be 60–100 feet. An aircraft running off runway A would then have only a small likelihood of striking relatively small and low profile runway edge sheave means K as compared with the much larger energy absorber units C. It will be understood that in arresting apparatus of this type, fabric tapes E provide considerable stretch during initial impact of aircraft B with pendant 24 so that peak impact stresses in pendant 24, tapes E an other components of the system are minimized due to the stretchability of fabric tapes E. In addition, this stretchability absorbs initial impact peak loads and provides time within which reels D can begin rotating. With such an apparatus, it is desirable to limit the amount of tension placed in tapes E prior to the arrestment of an aircraft. That is, if tapes E were tensioned to an extremely high stress by a holding device, tapes E would have no stretchability left to absorb the initial impact load and provide time within which the system could begin operating. With the maximum initial tension in tape E being limited, and the substantial span between lead-off sheave means J and runway edge sheave means K, tape E will assume a catenary configuration as shown in FIG. 3. That portion of tape E between sheave means J and K may be termed a first portion 56 of tape E which hangs in a catenary prior to arrestment of an aircraft even though tape E is under substantial tension. The showing in FIG. 3 is much exaggerated for clarity of illustration. As shown, first portion 56 of tape E hangs below a horizontal line 58 connecting sheave means J and K. Upon initial impact of aircraft B with pendant 24, the tension in tapes E is greatly increased and the holding means is released. Reels D will then begin rotating and brake units G will provide retarding torques which place tension in tapes E of a substantially greater magnitude than that originally provided by the holding means. During this initial impact, first portion 56 of tape E between sheave means J and K will be snapped upward as it is stretched more tautly between sheave means J and K. This impact tensioning of first portion 56 of tape E between sheave means J and K causes first portion 56 to oscillate with a very high frequency between the full line position and the shadow line position shown in FIG. 3. This high frequency oscillation occurs in a vertical plane parallel to the flat faces of tape E. The oscillation tends to be transmitted past sheave means J to a second portion 60 of tape E extending from reel D to lead-off sheave means J. Immediately after impact of an aircraft B with pendant 24, tapes E will be uncoiling from reels D at a very high linear rate of speed. For example, the linear speed of tapes E traveling past sheave means J may be 200–300 feet per second. In addition to the vertical oscillation described, first portion 56 of tape E between sheave means J and K may also have a lateral oscillation imparted thereto acting in a substantially horizontal plane as shown in FIG. 4. Therefore, first portion 56 will oscillate between the full line and shadow line positions shown in FIG. 4. Such a lateral oscillation may also be caused by the high rate of linear movement of tape E converting some of the vertical oscillation of FIG. 3 to a somewhat lateral oscillation as in FIG. 4. In addition, initial impact of aircraft B with pendant 24 will also create a horizontal oscillation in pendant 24 which may be transmitted past runway edge sheave means K to a first portion 56 of tape E. The lateral oscillation of FIG. 4 will tend to move tape E out of contact with sheave means J so that the vertical oscillation of FIG. 3 could easily pass sheave means J and be imparted to second portion 60 of tape E between reel D and sheave means J. If this vertical oscillation is permitted to pass sheave means J and be imparted to second portion 60 of tape E, the outermost layer of tape E uncoiling from reel D may wedge itself edgewise between neither sideplate 44 or 46 and the remaining layers of tape coiled upon reel D. It will be understood that the remaining layers of tape coiled upon reel D define a tape stack. If the outermost layer of tape wedges itself between a sideplate and the remaining tape stack as shown in FIG. 5, a backlash will tend to occur and an extremely large impact load will be imparted to reel D and aircraft B. Also, such a wedging action may knock sideplate 44 or 46 off from a reel D and the remaining layers of tape on the reel would fall off therefrom so that reels D would be incapable of providing any retarding torque to aircraft B.

It will be recognized that it is also important to guide tapes E onto reels D during the rewinding thereof so that each adjacent layer of tape on reels D will be substantially aligned with one another. If adjacent layers are somewhat misaligned, a succeeding layer of tape may uncoil from a reel D in a different path than the previous layer. That is, if the longitudinal center line of tape E intermediate edges 32 and 34 of an outer convolution is closer to sideplate 44 or 46 than the longitudinal center line of the following layer, rotation of reel D to uncoil tape E therefrom will cause the second portion 60 of tape E between sheave means J and reel D to oscillate between the full line position and the dotted line position shown in FIG. 6. Such misalignment of adjacent tape layers on reels D may create such a significant oscillation during high speed uncoiling of tapes E therefrom that an outer layer of tape will become wedged between a sideplate of reel D and the remaining tape layers as described with reference to FIG. 5.

In accordance with the present invention, lead-off sheave means J is positioned relative to reel D, and cooperates with tape E, in such a manner that the described oscillations cannot be imparted to second portion 60 of tape E between sheave means J and reel D. In accordance with the invention, lead-off sheave means J includes a pair of rotatable sheaves 62 and 64. Each sheave means J includes a baseplate 66 which is secured to baseplate 42 of energy absorber unit C as by bolts 68. Sheave means 62 and 64 are conventional and will be described only briefly with respect to sheave 64 of FIG. 2. A cylindrical hub or post 70 is welded or otherwise suitably secured to base 66 and projects upwardly therefrom on a substantially vertical axis. The bottom of post 70 is provided with an outwardly extending shoulder 72 on which a bearing 74 rests. A crowned sheave member 64 includes an intermediate radially inward projecting flange 76, the bottom edge of which rests against bearing 74. An upper bearing 78 received around post 70 rests against the upper edge of flange 76. A retaining member 80 has a shaft 82 threaded into a central bore in post 70 and the head of retainer 80 bears against bearing 78. Crowned sheave member 64 is circular and by the word "crowned" it is meant that the outer surface is shaped like a wooden stave barrel. While crowned sheaves are used in the preferred arrangement, it should be recognized that the present invention is not limited thereto and cylindrical or concave sheaves may also be used. Each sheave means J is positioned as shown in FIG. 7, with sheave 62 located as close as possible to the periphery of reel D. In a preferred arrangement, the periphery of sheave 62 is no greater than three feet from the periphery of reel D.

In the arrangement shown, sheaves 62 and 64 have a 10 inch diameter and their rotational axes are positioned 12 inches apart. The periphery of sheave 62 is located around three inches from the periphery of reel D. First portion 56 of tape E extends from sheave 64 with the longitudinal centerline of first tape portion 56 located on a line passing through the rotational axis of reel D. A line 84 connecting the rotational axes of sheaves 62 and 64 is parallel to the longitudinal centerline of first tape portion 56.

It is very important to maintain second portion 60 of tape E between reel D and sheave means J as short as possible, as a shorter length of tape is not conducive to supporting a continuous oscillation. At the end of an arrestment, tape E will be completely uncoiled from reel D and second portion 60 of tape E will extend from hub 22 of reel D to sheave 62 in the shadow line position shown in FIG. 7. It will be recognized that the positioning of sheave means J is such that maximum contact of tape E with sheaves 62 and 64 is maintained through out an entire arrestment cycle. The described arrangement provides optimum guidance to tape E during both coiling and uncoiling movement thereof relative to reel D.

It will be recognized that the only force which prevents transmission of the oscillations described with reference to FIGS. 3 and 4 past sheave means J is provided by frictional engagement of tape E with sheaves 62 and 64. This frictional force is rolling friction, which is less than static friction, and a very high normal force is required to maintain a sufficient frictional force for preventing transmission of the oscillations past sheave means J. If the normal force is too low, tape E will slip relative to sheaves 62 and 64 and impart oscillations to second portion 60 of tape E which extends between sheave means J and reel D. In accordance with the invention, the normal force is provided solely by the existing tension in tape E. With reference to FIG. 8, it will be recognized that tape E is in contact with sheave 64 over an angle M. In the arrangement illustrated, this angle would be around 45° and would remain at 45° throughout an entire arrestment cycle. The tension in tape E is represented by T. The resultant force R of tension T acts along the line 89 which bisects angle M. Bisecting line 89 makes an angle N with the tangent line of tape E. Therefore, the normal force may readily be determined as $R = 2\,T$ cosine $N$, and $N = 90° - M/2$. The resultant force R acting upon sheave 62 due to tape tension T may also be readily determined with reference to FIG. 9. The angle P is the total arc of contact of tape E with sheave 62 between its tangent lead-on and lead-off points. Resultant force R acts along the line 90 which bisects angle P. The angle S is measured from bisecting line 90 to the tangent line of tape E with sheave 62. Therefore, $R = 2\,T$ cosine $S$ and $S = 90° - P/2$.

In accordance with the invention, it has been found that it is necessary to maintain tape E in contact with sheave means J over an arc of at least 90° during at least the dynamic region of an arrestment cycle. That is, the contact arc with sheave J totals at least 90° during at least the dynamic region of an arrestment cycle. With this angle of contact, it has been found that the oscillations described with respect to FIGS. 3 and 4 will not be transmitted past sheave means J to the second portion 60 of tape E. With such an arrangement, the resultant normal force with which tape E laterally engages the sheave will be at least 41 percent greater than the tension force in the tape at any given point in time.

Each runway edge sheave means K also includes a pair of rotatable sheaves 92 and 94 mounted on a baseplate 96 which may be secured to a concrete foundation as by bolts 98. I should be recognized that arresting apparatus of the type described is sometimes used in the absence of runway edge sheave means K. That is, energy absorbing units C are positioned somewhat closer to edges 16 and 18 of runway A with tapes E extending directly from lead-off sheave means J to connection with pendant 24 without passing over any additional sheave means K. With such arrangements, the span between sheave means J and connections 26 will still be substantial, such as 60–100 feet, and tapes E will sag in a catenary as described. With such an arrangement, the present invention still provides bi-directional arresting capability in the direction of either arrows 12 or 14 in FIG. 1 while maintaining sheave means J operative to prevent transmission of oscillations to second portion 60 of tape E extending between sheave means J and reel D. In the absence of sheave means K, aircraft landing in the direction of arrow 12 will progressively cause tape E to come in contact over a greater arc with sheave 64 so that the desirable arc of contact is maintained. An aircraft landing in the direction of arrow 14 will cause tape E to progressively reduce its arc of contact with sheave 64. However, the arc of contact between tape E and sheave 62 is reduced by only a small amount, such as around 30°, so that tape E remains in contact with sheaves 62 and 64 over a total arc of at least 90° throughout the dynamic region of an arrestment cycle. Even if the tape comes out of contact with sheave 62 in this landing direction, sheave means J is positioned so that the arc of contact with sheave 64 would not be less than 90° during the dynamic region of an arrestment cycle. Sheave means J is preferably located so that the tape contacts both sheaves in either direction of arrestment. It will also be recognized that the dual sheave arrangement of sheave means J causes a reverse bending of tape E when it is being rewound upon reels D. This reverse bending of tape E maintains it in contact with sheaves 62 and 64 due to the very close positioning of the sheaves to one another and makes tape E track in a straight path through sheaves 62 and 64 notwithstanding some vertical misalignment between reel D and sheave means J. For example, FIG. 6 illustrates center line 102 of sheave means J positioned below center line 104 of reel D located centrally between sideplates 44 and 46. In previous arrangements, rewinding under such misaligned conditions often caused tape E to slip vertically relative to the lead-on sheave. Such slippage would cause portion 60 of tape E to move between the dotted line position and the full line position shown in FIG. 6 during rewinding thereof on reel D. Such misalignment of the tape stack during rewinding also causes unwinding in different paths so that an oscillation could be imparted to second portion 60 of tape E as previously described. With the sheave arrangement of the present invention, tape E is made to track in a straight path and its large arcuate contact with sheaves 62 and 64, as well as its reverse bending, prevents slippage thereof relative to the sheaves. While misalignment of sheave means J above or below center line 104 may cause tape E to be coiled closer to either sideplate 44 or 46, concentric layers of tape stored on reel D will still be in substantial alignment with one another and the tape will uncoil from reel D in the same path so that no oscillations are imparted thereto.

In the most preferred arrangement, sheave means J includes at least a pair of closely spaced sheaves and the tape is reversely curved in passing around the sheaves. In another arrangement which is not as good as the preferred arrangement, it is possible to position a single lead-off sheave relative to a reel so that a tape will remain in contact with the single sheave over an arc of at least 90° throughout an entire arrestment. While such a single sheave arrangement is within the scope of the present invention, it will be recognized that it does not have all of the advantages of the preferred arrangement. For example, a single sheave arrangement will not provide the same tracking quality for guiding the tape in a straight line during coiling and uncoiling operations. In addition, a single lead-off sheave cannot be located to maintain the tape in contact over an arc of at least 90° in apparatus capable of arresting aircraft landing in either of opposite directions. However, a single sheave arrangement is possible where aircraft are arrested in only one direction and less accurate tracking than in the preferred arrangement is satisfactory.

It should also be recognized that another important feature of the present invention is the use of identical arresting units C on each side of runway A. That is, each reel rotates clockwise in uncoiling and counterclockwise in coiling. Naturally, the reverse relationship could also be used. In any event, this arrangement is highly advantageous over a system wherein the arresting units on each side of a runway are different. The use of identical unit simplifies manufacture and installation, and requires only one replacement unit which is capable of replacing either of the two units in use.

It should be recognized that the predetermined tension maintained in the tape by the releasable holding means is great enough to produce a resultant normal force of engagement between the tape and sheave means which will prevent oscillations from being transmitted past the sheave means to the second portion of the tape during initial impact of an aircraft with the pendant. Placing only slight tension in the tape by use of the holding means would provide a resultant normal force of engagement between the tape and sheave means which would be insufficient to prevent oscillations from being transmitted past the sheave means to the second portion of the tape during the initial engagement stage of an arresting cycle. Therefore, the present invention provides sufficient tension in the tape during the initial stage of an arrestment, as well as during the remainder of an arrestment cycle, to produce a resultant normal force between the tape and sheave means which prevents transmission of oscillations to the second portion of the tape.

While a preferred embodiment of the present invention has been described, it will be recognized that the present invention includes certain basic concepts which can be achieved with other arrangements. The present invention includes all equivalent variations which accomplish the novel basic concepts disclosed. Basically, arrestment of an aircraft with an arresting barrier of the type described involves two phases or regions. For example, an apparatus of the type described may have tapes E which are long enough to allow an aircraft B to travel a distance of around 1,000 feet after initial engagement with pendant 24. That period of an arrestment cycle which occurs beginning with initial impact of aircraft B with pendant 24, and ending when around 200–300 feet of tapes E have been uncoiled, if often referred to as the dynamic region of arrestment. During this dynamic region, the aircraft is essentially out of control. That is, the aircraft cannot be aerodynamically controlled because it is going too slow and cannot be controlled by use of a steering wheel or mechanical brakes because it is going too fast. After around 200–300 feet of tapes E have been uncoiled, an aircraft reaches a controllable region during which it can be steered and possibly brought to a safe stope by use of its own brakes. Preventing the described oscillations and vibrations in tapes E from reaching reels D is most critical during initial engagement of aircraft B with pendant 24 and during the described dynamic region of arrestment. Once the dynamic region of arrestment has been passed, the described oscillations and vibrations will have been damped somewhat. That is, the described oscillations and vibrations in tapes E are less critical during the controllable region of an arrestment. Therefore, the present invention contemplates a wrap angle between tapes E and sheave means J over an arc of at least 90° during at least the dynamic region of an arrestment. Therefore, under certain conditions of arrestment, or where less than optimum performance is required, it is possible to position sheave means J in such a manner that tapes E are in contact therewith over an arc of at least 90° during the dynamic region of arrestment but are in contact over an arc of less than 90° during the controllable region of an arrestment. In this regard, it will be recognized that the misalignment problem solved by the preferred embodiment with reference to FIG. 6 may also be accomplished in a less satisfactory manner by maintaining sufficient contact between tapes E and sheave means J only during the last 200–300 feet during which the tapes are coiled back onto reels D. Such an arrangement would provide accurate tape alignment of tapes E on reels D during the critical dynamic region of tape runout and allow some misalignment during the less critical controllable region of arrestment. It will also be recognized that sheave means J may be positioned to maintain tapes E in contact therewith over at least 90° during the dynamic region of arrestment while performing substantially no alignment function during recoiling as described with reference to FIG. 6. For example, certain arrestment conditions may not require accurate coiling, or other devices may be utilized to accomplish it. Such modifications are intended to come within the scope of the present invention even though they may be less satisfactory than the preferred embodiment and cannot completely accomplish all the desirable results. In the arrangement of the preferred embodiment, tapes E contact sheave means J over an arc of at least 90° throughout the entire arrestment cycle, including both the dynamic and controllable regions. This wrap angle is maintained during coiling of tapes E back onto reels D so that misalignment of adjacent tape layers on the reels is substantially eliminated.

In the arrangement where runway edge sheaves K are not utilized, sheave means J may be repositioned as shown in FIG. 11. In this arrangement, first portion 56, of tape E extends in substantial alignment with the rotational axis of reel D. Line 84 connecting the rotational axes of sheaves 62 and 64 intersects portion 56 of tape E at an angle 86 of around 30°. A line 88 substantially tangent to both sheaves 62 and 64 intersects the axis of second portion 60 of tape E at substantially 90°. This arrangement provides bi-directional arrestment capabilities without runway sheaves K while maintaining a wrap angle of at least 90° in either direction. The preferred arrangement, and the arrangement of FIG. 11, provides a wrap angle of at least 90° throughout an entire arrestment cycle including both the controllable and dynamic regions. Modifications of the described arrangements are possible where bi-directional arrestment is not required where less than optimum tracking is satisfactory during coiling of tapes E onto reels D.

While a preferred embodiment of the present invention has been described in the forgoing specification and illustrated in the accompanying drawings, it is to be understood that the disclosed embodiment is only illustrative and is not to be taken in a limiting sense. The present invention includes all equivalent variations and obvious modifications of the disclosed embodiment and is limited only by the scope of the claims.

Having thus described our invention, we claim:

1. In an aircraft arresting apparatus having reel means rotatably mounted on a substantially vertical axis, flat elongated tape means having first and second ends, said first end being connected with said reel means and said tape being wound thereon in layer-by-layer convolutions, said tape having opposite flat faces, a thickness dimension and a width dimension many times greater than said thickness dimension, pendant means connected with said second end of said tape, said tape extending from said reel means with said width dimension lying in a substantially vertical plane, lead-off sheave means positioned closely adjacent said reel means on a substantially vertical axis, said tape extending directly from said reel means to said sheave means with at least one of said flat faces of said tape contacting said sheave means, runway edge sheave means spaced from said sheave means, said tape extending directly from said sheave means to said runway edge sheave means and having at least one of said flat faces in contact with said runway edge sheave means, said runway edge sheave means being spaced from said sheave means a substantially greater distance than the distance between said sheave means and said reel means, holding means for holding said reel means against rotation with a first portion of said tape stretched under predetermined tension between said runway edge sheave means and said sheave means and with a second portion of said tape stretched under predetermined tension between said sheave means and said reel means, said pendant means being engageable by an aircraft to place said pendant and said first portion of said tape under impact tension substantially greater than said predetermined tension and produce oscillations in said first portion of said tape parallel to said width dimension, said oscillations tending to cause said second portion of said tape to oscillate, said tape being under arresting tension as said reel means rotates and said tape uncoils therefrom during arrestment of an aircraft, said tape being engaged with said sheave means under a resultant normal force produced by said tension in said tape, said resultant normal force produced by said tension in said tape, said resultant normal force being proportional to said tension in said tape, said sheave means being positioned relative to said reel means to maintain said flat face of said tape in engagement with said sheave means over an arc of at least 90° throughout at least a dynamic region of an arrestment cycle, and said predetermined tension and said arresting tension maintaining said resultant normal force great enough to prevent oscillations in said first portion of said tape from being transmitted past said sheave means to said second portion of said tape during initial engagement of an aircraft with said pendant and throughout at least a dynamic region of an arrestment cycle.

2. The device of claim 1 wherein said reel means has a peripheral edge and said sheave means is positioned not greater than three feet from said peripheral edge.

3. The device of claim 2 wherein said sheave means includes at least two sheaves and each of said flat faces of said tape is in contact with one of said two sheaves.

4. An aircraft arresting apparatus having reel means rotatably mounted on a substantially vertical axis, flat elongated tape means having first and second ends and opposite flat faces, one of said ends of said tape means being connected with said reel means, said reel means being rotatable in a first direction to coil said tape thereon in layer-by-layer convolutions and in a second opposite direction to uncoil said tape therefrom, sheave means positioned closely adjacent said reel means on a vertical axis, said tape means extending directly from said reel means to said sheave means with at least one of said flat faces contacting said sheave means, runway edge sheave means spaced from said sheave means, said tape extending directly from said sheave means to said runway edge sheave means and having at least one of said flat faces in contact with said runway edge sheave means, said runway edge sheave means being spaced from said sheave means a substantially greater distance than the distance between said sheave means and said reel means, said sheave means being located relative to said reel means to maintain said flat face in contact with said sheave means over an arc of at least 90° during both coiling and uncoiling movement of said tape.

5. The device of claim 4 wherein said sheave means comprises at least two sheaves positioned closely adjacent one another and each of said flat faces is in contact with one of said two sheaves.

6. The device of claim 5 wherein said tape is reversely curved in passing over said sheaves.

7. The device of claim 4 wherein said sheave means and reel means are mounted on a common base.

8. The device of claim 7 wherein said reel means has an outer peripheral edge and said sheave means is positioned not greater than three feet from said peripheral edge.

9. The device of claim 4 wherein said reel means has an outer peripheral edge and said sheave means is positioned not greater than three feet from said peripheral edge.

10. Aircraft arresting apparatus including a pair of energy absorber units mounted on opposite sides of an aircraft runway, said energy absorber units being substantially identical and comprising; reel means rotatably mounted on a substantially vertical axis, flat elongated tape means having first and second ends, said first end being connected with said reel means and said tape being wound thereon in layer-by-layer convolutions, said tape having opposite flat faces, a thickness dimension and a width dimension many times greater than said thickness dimension, pendant means connected with said second end of said tape, said tape extending from said reel means with said width dimension lying in a substantially vertical plane, lead-off sheave means positioned closely adjacent said reel means on a substantially vertical axis, said tape extending directly from said reel means to said sheave means with at least one of said flat faces of said tape contacting said sheave means, runway edge sheave means spaced from said sheave means, said tape extending directly from said sheave means to said runway edge sheave means and having at least one of said flat faces in contact with said runway edge sheave means, said runway edge sheave means being spaced from said sheave means a substantially greater distance than the distance between said sheave means and said reel means, holding means for holding said reel means against rotation with a first portion of said tape stretched under predetermined tension between said pendant and said sheave means and with a second portion of said tape stretched under predetermined tension between said sheave means and said reel means, said pendant means being engageable by an aircraft to place said pendant and said first portion of said tape under impact tension substantially greater than said predetermined tension and produce oscillations in said first portion of said tape parallel to said width dimension, said oscillations tending to cause said second portion of said tape to oscillate, said tape being under arresting tension as said reel means rotates and said tape uncoils therefrom during arrestment of an aircraft, said tape being engaged with said sheave means under a resultant normal force produced by said tension in said tape, said resultant normal force being proportional to said tension in said tape, said sheave means being positioned relative to said reel means to maintain said flat face of said tape in engagement with said sheave means over an arc of at least 90° throughout at least a dynamic region of an arrestment cycle, and said predetermined tension and said arresting tension maintaining said resultant normal force great enough to prevent oscillations in said first portion of said tape from being transmitted past said sheave means to said second portion of said tape during initial engagement of an aircraft with said pendant and throughout at least a dynamic region of an arrestment cycle, said reel means on said pair of energy absorber units being rotatable in a common direction to uncoil said tape means therefrom and being rotatable in an opposite common direction for coiling said tape means thereon.

11. The device of claim 10 wherein reel means and sheave means for each of said energy absorber units are mounted on a common base.

12. The device of claim 11 wherein each of said reel means includes an outer peripheral edge and said sheave means is positioned not greater than 3 feet from said peripheral edge.

* * * * *